Oct. 5, 1937.  L. DUBINSKI ET AL  2,094,878
BATTERY PLATE PASTING MACHINE
Filed Feb. 11, 1935  3 Sheets-Sheet 3
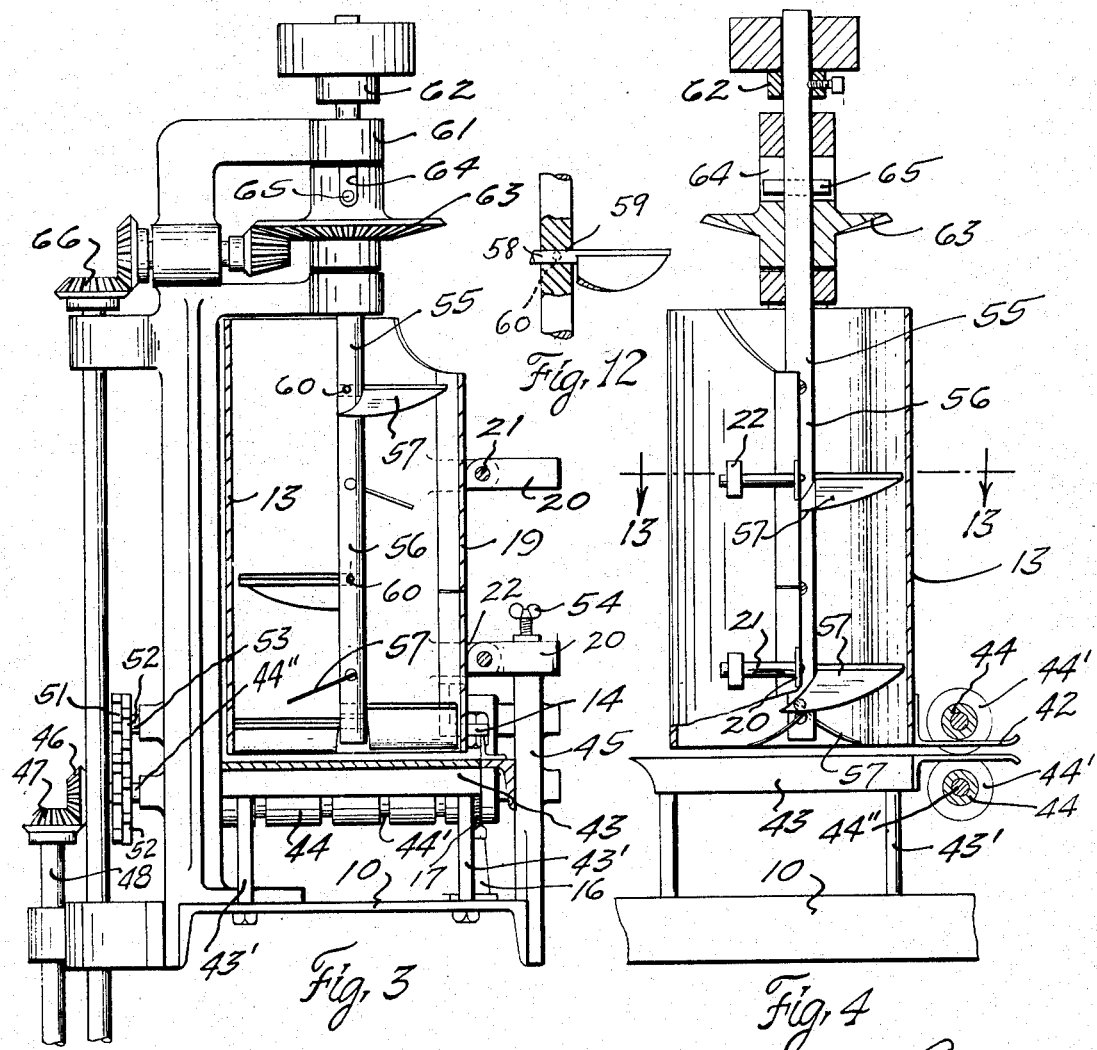
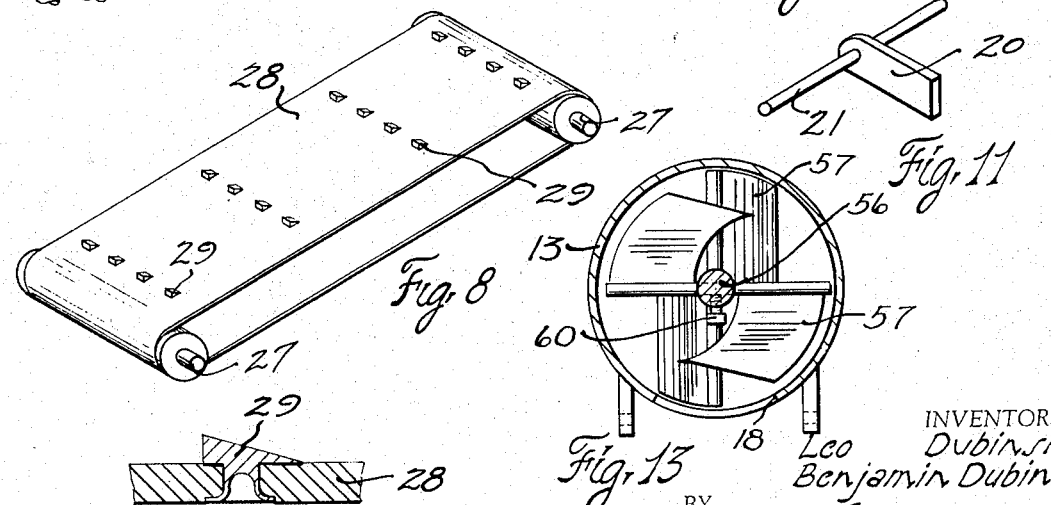
INVENTORS
Leo Dubinski
Benjamin Dubinski
BY Jack A. Ashley
ATTORNEY Patented Oct. 5, 1937

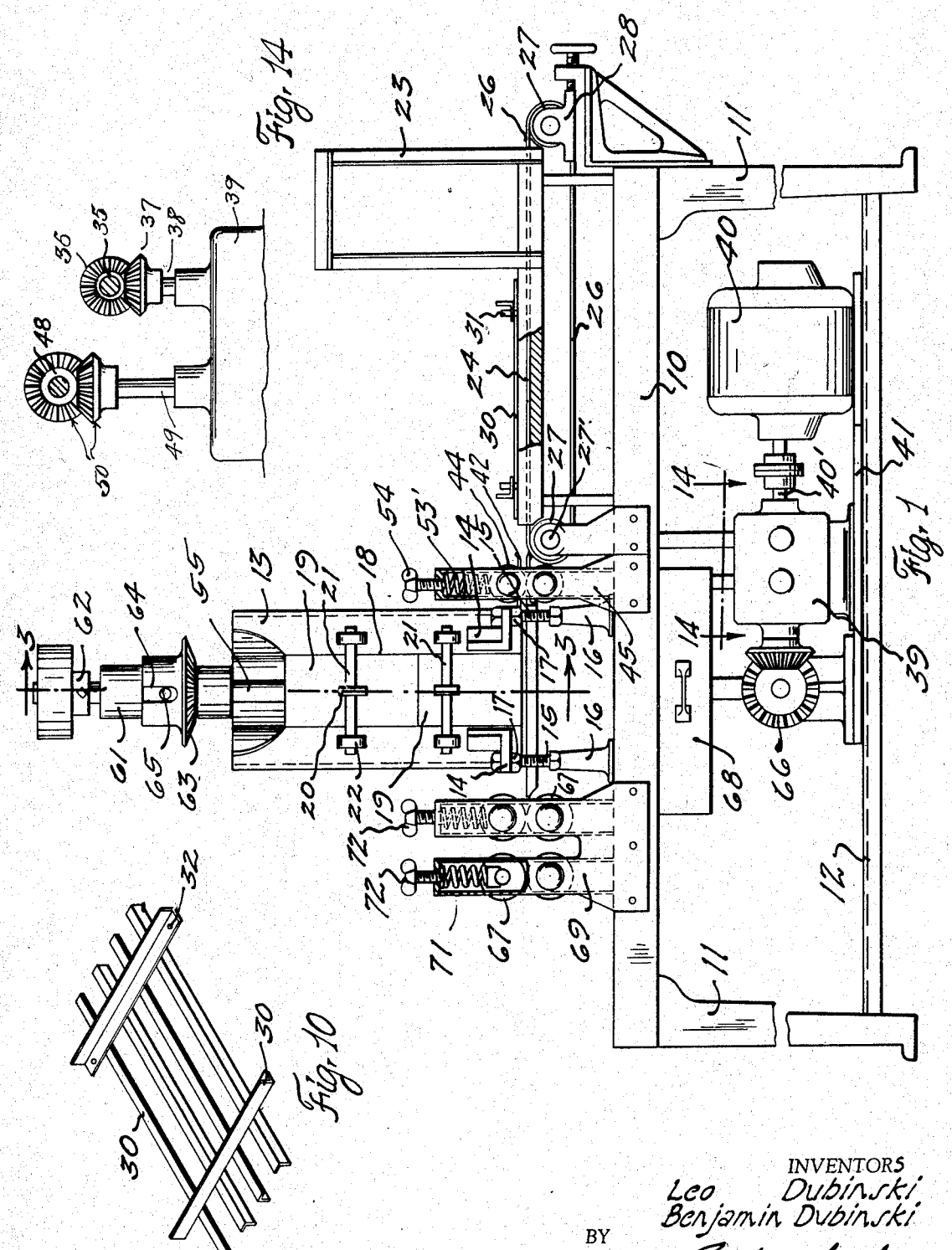

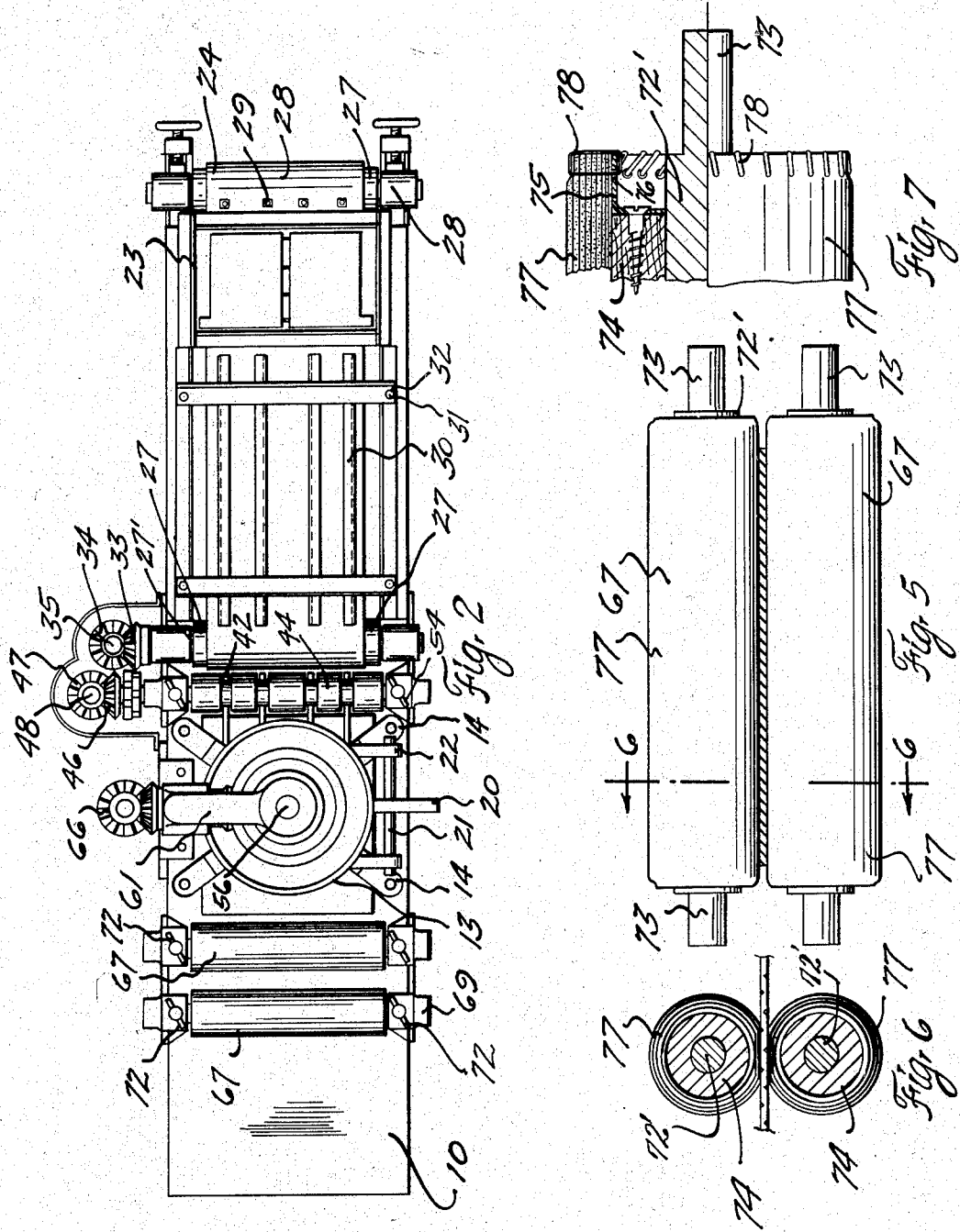

2,094,878

UNITED STATES PATENT OFFICE 2,094,878

BATTERY PLATE PASTING MACHINE

Leo Dubinski and Benjamin Dubinski,
San Antonio, Tex.

Application February 11, 1935, Serial No. 6,010

6 Claims. (Cl. 226—39)

This invention relates to new and useful improvements in battery plate pasting machine.

One object of the invention is to provide an improved machine which will efficiently apply litharge and lead oxide paste, or similar material, to a battery plate, or grid, without the use of paper, or other covering to hold the paste in the interstices of the plate during application, as is the usual practice.

An important object of the invention is to provide follower rollers on a battery plate pasting machine, through which the plates pass after paste has been applied, whereby the paste is pressed uniformly into the interstices of said plates, thereby producing a more uniform plate; said rollers being so constructed that paste will not adhere thereto as the plates pass therebetween, whereby a smooth and even surface is given the applied paste on each plate, and pits, holes, and other unevenness in said paste are reduced to a minimum. Also the rollers serve to press out any excess moisture in the paste, which permits the finished plates to be dried quicker.

Another object of the invention is to provide an improved conveyor for feeding paste onto battery plates, which is movable with relation to said plates, whereby when the consistency of the paste being applied becomes heavy, or for any reason is not being fed properly to the plates, the conveyor is forced upwardly, thereby notifying the operator that the paste consistency is not proper, or the conveyor is feeding inefficiently.

A further object of the invention is to provide an improved conveyor, including inclined blades which are adjustable on the conveyor shaft, whereby the pitch of said blades may be varied to properly feed pastes of varied consistencies onto battery plates.

Still another object of the invention is to provide improved means for feeding battery plates to a pasting machine which includes guide fingers, adjustable with relation to each other, through which the plates must pass, together with feeding rolls which pull rather than push the plates into the pasting apparatus, whereby the plates are prevented from riding up over each other and are kept in alinement during the feeding operation.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is a side elevation of a battery plate pasting machine, constructed in accordance with the invention, Figure 2 is a plan view of the same, Figure 3 is an enlarged transverse vertical, sectional view, taken on the line 3—3 of Figure 2, Figure 4 is an enlarged view, partly in elevation and partly in section of the paste container and conveyor, Figure 5 is a front elevation of the follower rolls, Figure 6 is a transverse, vertical sectional view, taken on the line 6—6 of Figure 5, Figure 7 is an enlarged view, partly in elevation and partly in section, showing one end of one of the follower rollers, Figure 8 is an isometrical view of the feed belt, Figure 9 is an enlarged sectional view, showing one of the lugs of said feed belt, Figure 10 is an isometrical view showing the plate retainer frame, Figure 11 is an isometrical view of one of the latches for the door of the paste container, Figure 12 is a sectional view of the blade mounting, Figure 13 is a horizontal cross-sectional view, taken on the line 13—13 of Figure 4, and Figure 14 is a horizontal cross-sectional view, taken on the line 14—14 of Figure 1.

In the drawings the numeral 10 designates a frame which may be constructed of metal, or other suitable material. The frame is supported above floor level by suitable legs 11 and is preferably rectangular in shape, although it may be of any suitable shape. The legs are braced and connected by transverse angle bars 12.

A cylindrical container 13 is mounted on the frame nearer one end thereof, which for purposes of description will be referred to as the rear end. The container is provided with angular lugs 14 at its lower end and these lugs are formed with openings which receive the upper ends of supporting bolts 15. Four lugs and bolts are provided and each bolt has its lower end extending upwardly from a vertically extending post 16, which is secured to the frame 10. Lock nuts 17 are threaded on each bolt above and below each lug (Figure 1), and it is obvious that by changing the position of the nuts on the bolts the container may be lowered and raised with relation to the frame.

The container is provided with a cut-out portion or opening 18 extending throughout its vertical length. This opening is normally closed by arcuate doors 19 which have the same radius as the container so that when the doors are in position, the container is perfectly cylindrical. The vertical edges of each door are cut on the radius of the container (Figure 13) so as to prevent inward displacement. Outward displacement of each door is prevented by a cam-shaped latch 20, which is centrally fastened on a transverse shaft 21. The shaft is mounted in ears 22, which extend outwardly from the container on each side of said door. In removing the door, the latch is rotated so as to disengage the outer face of the door. The shaft 21 is then moved to one side so that the latch is moved off center. This causes one end of the shaft to disengage one of the ears 22, after which the other end is disengaged from the other ear. The door may then be readily removed. Replacement of the door and latch is accomplished in a similar way, and it is obvious that easy access may be had to the interior of the container.

The container is arranged to receive the litharge and lead oxide paste, or other material which is to be applied to the battery plates. The plates are stacked in a magazine 23 located at the forward end of the frame 10. The magazine is mounted directly over a horizontal belt conveyor 24, which carries the plates from the magazine to beneath the container 13. The conveyor comprises an endless belt 26 which is mounted to travel around a pair of rollers 27 supported in bearing brackets 28 extending upwardly from the frame.

The belt is provided with a plurality of lugs 29 (Figure 9), which are located in transverse rows at spaced intervals along the belt. The lugs engage the spaces in the lowermost battery plate in the magazine and it is obvious that as the belt travels toward the container the plates will be carried therewith. It is pointed out that the rows of lugs are so located that each row engages a plate, whereby when the belt is in motion plates lie along its full length. To prevent the plates on the belt from riding over each other and to hold them in horizontal alinement, a removable angular frame member 30 is positioned above the belt. Lateral displacement of the frame is prevented by the engagement of vertical pins 31 supported on the frame 10 engaging openings 32 at the corners of the member 30.

For moving the belt in a direction toward the container 13, the rear roller 27 has one end of its shaft 27' extending outwardly from one side of the frame 10. A bevel gear 33 is fastened on this outer end of the shaft and is in constant engagement with another bevel gear 34 secured to the upper end of a vertical shaft 35. The shaft 35 has a gear 36 at its lower end which is engaged by a gear 37 (Figure 14), on the outer end of a horizontal shaft 38 extending outwardly from a reduction gearing 39. The reduction gearing is driven by the shaft 40' of an electric motor 40. The motor and reduction gearing casing are suitably supported on a plate 41 which is carried by the transverse connecting bars 12 of the frame. It is obvious that when the motor is operating the rear conveyor roller shaft 27' is rotated in a counter-clockwise direction (Figure 1) through the medium of the reduction gearing 39, vertical shaft 35 and bevel gears.

This rotation of the rear roller shaft moves the belt 26 toward the container 13, thereby carrying the plates thereon toward said conveyor. The upper half of the belt is positioned in alinement with a pair of spring guide fingers 42.

The upper finger is carried by the lower end of the container and is, therefore, vertically movable therewith. The lower finger is rigidly secured to a stationary transverse plate, or support, 43, which is supported on the frame 10 by legs 43'. The plate is located directly beneath the container 13.

The battery plates carried by the conveyor move from the belt between the spring fingers 42. The space between the fingers is the exact width of the plates being handled and thus only one plate at a time can enter between said fingers. This prevents the plates piling up, one behind the other on the conveyor.

For moving the plates from between the fingers 42 and onto the support 43 beneath the container, a pair of transversely extending grooved rollers 44 are provided. The rollers are positioned midway of the fingers 42, the grooves 44' therein permitting the fingers to extend therethrough. As clearly shown in Figures 1 and 4, as a plate moves between the fingers, the rollers 44 rotating the upper one in a clockwise direction and the lower one in a counter-clockwise direction, engage opposite sides of the plate to move it onto the support 43 beneath the container. The rollers are preferably covered with rubber, or similar gripping material, or they may be knurled, whereby they will positively grip the battery plates passing through the machine.

The lower roller 44 has its shaft 44'' mounted in vertical brackets 45 extending upwardly from the frame 10. One end of this shaft extends outwardly from one side of the frame and carries a right angle gear 46 which is in constant engagement with a gear 47 mounted on a vertical shaft 48. This latter shaft is driven by the reduction gearing 39 through a horizontal shaft 49 and bevel gears 50. Thus, it is obvious that rotation is imparted to the lower roller 44 by the motor 40. This motion is transmitted to the upper roller 44 through a flexible drive connection 51 which passes over gears 52 fastened on the shaft 44'' of the lower roller and on the shaft 53 of the upper roller 44.

The shaft 53 of the upper roller 44 is vertically movable in the brackets 45 and is normally pressed towards the lower roller 44 by coiled springs 53' which have their lower ends bearing on the lower roller. The upper end of each spring bears against the lower end of an adjusting screw 54 threaded through the bracket, whereby the tension of the springs on the upper roller may be readily varied to accommodate various thickness battery plates therebetween.

As each battery plate is conveyed beneath the container 13, the paste within said container is forced downwardly onto said plate by a screw conveyor 55, which is vertically disposed axially within said container. The conveyor includes a shaft 56 having a plurality of curved blades 57 mounted thereon. The mounting of each blade is clearly shown in Figure 12. Each blade has a pin 58 made integral therewith and this pin extends through a diametrically extending opening 59 in the shaft. A set screw 60 holds the pin in a fixed position. By loosening the screw and rotating the pin in its opening, it is obvious that the pitch of the blades may be varied, thereby being adjustable, according to the particular consistency of paste being used.

The mounting of the conveyor shaft 56 is an important feature of the invention. As clearly shown in Figures 3 and 4, the upper end of the shaft extends through a supporting bracket 61.

A collar 62 is fastened on the upper end of the shaft above the bracket and may engage the bracket, whereby the shaft is suspended from said bracket. A driving gear 63 surrounds the shaft and is provided with diametrically opposite vertical slots 64 in its hub. A pin 65 extending through the shaft 56 engages in these slots, and with this arrangement, it is obvious that rotation of the gear 63 will rotate the conveyor shaft 56. However, said shaft is capable of limited vertical movement.

For rotating the drive gear 63, a gear train 66 has one end connected to said gear and its other end connected to the reduction gearing 39, whereby the motor 40 drives the conveyor 55, as well as the rollers 44 and 27. From the above, it will be seen that as each battery plate moves beneath the container, the screw conveyor 55 forces the paste downwardly into the interstices of said plate. Should the consistency of the paste become too heavy, said paste will force the conveyor shaft 56 upwardly, the pin 65 moving vertically in the slot 64 in the gear hub. Thus the operator will immediately know that the paste is of an improper consistency and can remedy the deficiency without waiting to see the completed plates.

Since the rollers 44 feed the battery plates at a constant speed, the plates beneath the container are pushed therefrom by the incoming plates. As has been pointed out, the entire container is vertically adjustable with relation to the frame 10 and support 43, and the space between the underside of the container and said support is only sufficiently wide to receive one plate. Thus, as each plate has paste applied thereto, it is pushed from beneath the container and between a pair of follower rolls 67. As the plates move from beneath the container, excess paste is sheared or stripped from said plates, due to the fact that the space between the container and support 43 is only wide enough for the plate. The excess paste falls into a receptacle 68 located in the frame beneath the support 43.

The follower rolls 67, which receive the plates as they pass from beneath the container, are an important feature of the machine. The purpose of these rolls is to press the paste firmly into the interstices of the plates and also to smooth said paste. The main difficulty up to the present time has been that particles of the paste have adhered to said rolls, causing pits, holes, and unevenness in the paste applied to the plates. This has been due to the fact that no means has been found to keep the rolls clean during operation.

The rolls 67 are mounted in brackets 69, similar to the mounting of the feed rolls 44. Two pairs of rolls 67 are shown, but any desired number may be employed. The upper roll 67 of each pair is movable vertically, being held in position by coiled springs 71. Adjusting screws 72 at the upper end of the springs permit variation of the spring tension. The construction of the rolls 67 is clearly shown in Figures 6 and 7. Each roll comprises a central transverse shaft 72' having trunnions 73 at each end. A sleeve 74 of wood, or similar material, surrounds the shaft and has its ends terminating short of the ends of said shaft. An annular angular metal bracket 75 has its end flange fastened to the end of the sleeve 74 and has its annular flange overlying and surrounding the end of the shaft in spaced relation thereto. This annular flange forms a continuation of the sleeve 74 (Figure 7) and is provided with a series of openings 76 in its outer marginal portion.

A length 77 of cloth having absorbent qualities, or similar material, is then wound around the sleeve and brackets 75, as clearly shown in Figure 7. The precise number of layers of this cloth is immaterial. The cloth is secured to the ends of the brackets 75 by a tying or stitching cord 78, which passes through the material and through the openings 76 in said brackets. In other words, by a stitching or looping and tying process. This fastening means has been found to give the best results, because if the ends of the material are riveted, or otherwise rigidly secured to the brackets, there is no way for moisture and particles of dirt or paste to escape from the rolls, and therefore they soon become saturated and dirty and as a result do inefficient work.

By fastening the material as shown, it will be seen that the water pressed from the paste in the battery plates passing between the rolls, is absorbed by the material 77. The next time said rolls are under pressure, this water is squeezed from the rolls, escaping from the ends of the material between the stitches of cord. Any particles of dirt or paste adhering to the rolls is carried away by the water and thus it is obvious that the rolls 67 are kept clean, which makes for more efficient pressing of the paste into the interstices of the battery plates and smoother work.

It is pointed out that a most efficient machine is provided. The plates are carried onto the support 43 beneath the container by the belt and feed rollers 44. The frame member 30 and spring fingers 42 prevent the plates from riding over each other and keep them in horizontal alinement. The container is vertically adjustable to accommodate various size battery plates. The screw conveyor is provided with adjustable blades which makes it adaptable for pastes of varying consistencies. The vertically movable conveyor notifies the operator when the consistency of the paste is too thick or heavy for efficient application to the battery plates. The provision of the specially constructed follower rolls 67 makes for smoother and more finished articles. The device entirely eliminates the use of paper, which holds the paste in the interstices of the battery plate while being applied, which results in a great saving in time and cost. There may be a plurality of the rolls 67 provided and as the battery plates leave the last pair of these rolls, they are delivered to the hands of the operator or to a receptacle (not shown). It is brought out that the follower rolls are not positively driven, but are rotated by the plates being forced therebetween by the feed rollers 44.

Although a single grid battery plate is shown as passing through the machine it is obvious that the container and feeding rolls, as well as, the follower rolls can be adjusted so as to accommodate two or three plates passing therethrough at the same time.

What we claim and desire to secure by Letters Patent, is:

1. In combination, in a battery plate pasting machine of the character described, comprising, means for applying the paste to the plates, means for moving the plates sequentially from the paste applying means to and between cooperative presser rolls, and a pair of said rolls each of which has a circumferential covering of a continuous sheet of absorbent material rolled with a multiplicity of convolutions about the roll body without attachment to each other or to the roll body except at the margins of the sheet, the marginal portions of the convolutions being secured together and to the end portions of the roll body by flexible securing means, whereby, in addition to the absorptive quality of said circumferential covering, it is reactive, when relieved of compression, to expel and prevent adherence of extraneous substance from the surface.

2. A battery plate pasting machine comprising, a frame, a container mounted on the frame for receiving the plate paste, a plate magazine mounted on the frame, opposed resilient guide fingers mounted at one side of the container, means for conveying the plates one at a time from the magazine to between said fingers, feed rollers located in correlation to the fingers for moving each plate from between said fingers to the paste delivery outlet of the container, and a conveyor screw having adjustable blades within the container for forcing the paste in said container through the delivery outlet thereof into the interstices of the positioned plate.

3. A battery plate pasting machine comprising, a frame, a vertically adjustable container mounted on the frame for receiving the plate paste, a plate magazine mounted on the frame ahead of the container, guide fingers mounted on the frame at one side of the container, cooperating guide fingers mounted on the lower side portion of the container, means conveying the plates one at a time from the magazine to between said fingers, feed rollers located in correlation to the fingers for moving each plate from between said fingers to beneath the container, means for adjusting the rolls to accommodate plates of various thicknesses, and a conveyor screw having adjustable blades within the container for forcing the paste in said container into the interstices of the plate therebeneath.

4. A battery plate pasting machine comprising, a frame, a container mounted on the frame for receiving the plate paste, a plate magazine mounted on the frame ahead of the container, resilient fingers mounted in opposed relation to the side of the container towards said magazine, means for conveying the plates one at a time from the magazine to between said fingers, feed rollers located in correlation to the fingers for moving each plate from between said fingers to beneath the container, means for adjusting the rolls to accommodate plates of various thicknesses, a conveyor screw having adjustable blades within the container for forcing the paste in said container into the interstices of the plate therebeneath, said conveyor being longitudinally movable and accordingly yielding upon the paste in the container becoming of a certain density, and follower rolls for receiving each plate between them after paste has been applied to firmly press the paste into the plate.

5. A battery plate pasting machine comprising, a frame, a vertically adjustable container mounted on the frame for receiving the plate paste, a plate magazine mounted on the frame ahead of said container, resilient guide fingers mounted on the frame at the side of the container towards said magazine, cooperating guide fingers mounted on the lower side portion of said container in cooperatively spaced relation above said other guide fingers, means for conveying the plates one at a time from the magazine to between said fingers, feed rollers located in correlation to the fingers for moving each plate from between the fingers to beneath the container, means for adjusting the rolls to accommodate plates of various thicknesses, a conveyor screw having adjustable blades within the container for forcing the paste downwardly in said container and into the openings of the plate therebeneath, cooperatively opposed follower rolls for receiving between them each plate after the paste has been applied whereby to firmly press the paste into the openings of the plate, said rolls each having a circumferential covering of absorbent material formed by winding thereon a strip of the material to provide a multiplicity of layers of the absorbent material and said material being attached to the roll only at the margins of the strip and by means of spaced stitching.

6. In a battery plate pasting machine, a cooperative pair of follower rolls for receiving between them the plates after the paste has been applied, each of said rolls comprising a cylindrical body, annularly flanged members at the opposite ends of said cylindrical body, and a strip of absorbent material wound on said cylindrical body to produce the multiplicity of layers of the absorbent material, said layers being free of attachment except at the marginal portions of the strip, said marginal portions being secured to the annularly flanged end members of the cylindrical body by spaced stitching.

LEO DUBINSKI.
BENJAMIN DUBINSKI.